US006928243B2

United States Patent
Youn et al.

(10) Patent No.: US 6,928,243 B2
(45) Date of Patent: Aug. 9, 2005

(54) OPTICAL PERFORMANCE MONITORING APPARATUS FOR A WDM OPTICAL COMMUNICATION SYSTEM

(75) Inventors: Ji-Wook Youn, Taejon (KR); Sung-Un Lee, Taejon (KR); Kwang-Joon Kim, Taejon (KR); Jong-Hyun Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 493 days.

(21) Appl. No.: 09/736,267

(22) Filed: Dec. 15, 2000

(65) Prior Publication Data

US 2003/0030859 A1 Feb. 13, 2003

(30) Foreign Application Priority Data

Sep. 19, 2000 (KR) ........................................ 2000-54803

(51) Int. Cl.[7] .............................................. H04B 10/08
(52) U.S. Cl. ............................................ 398/33; 398/38
(58) Field of Search ............................. 398/33, 14, 26, 398/38

(56) References Cited

U.S. PATENT DOCUMENTS

| | | | | |
|---|---|---|---|---|
| 5,859,716 A | * | 1/1999 | O'Sullivan | 398/17 |
| 5,986,782 A | * | 11/1999 | Alexander et al. | 398/26 |
| 6,009,220 A | * | 12/1999 | Chan et al. | 385/24 |
| 6,215,584 B1 | * | 4/2001 | Yang et al. | 359/337.4 |
| 6,219,162 B1 | * | 4/2001 | Barnard et al. | 398/9 |
| 6,304,696 B1 | * | 10/2001 | Patterson et al. | 385/37 |

* cited by examiner

Primary Examiner—Jason Chan
Assistant Examiner—David Payne
(74) Attorney, Agent, or Firm—Moser, Brown, Rowe & Maw LLP

(57) ABSTRACT

The optical performance monitoring apparatus includes a first optical distributor for distributing a WDM optical signal branched from an optical transmission line, a plurality of wavelength selectors, each for selecting a predetermined wavelength optical signal from the optical signal distributed, a plurality of first optical detectors, each for detecting power of the predetermined wavelength optical signal for a corresponding one of channels selected by the wavelength selectors; and a signal processor for measuring the power for each channel of the WDM optical signal, a total ASE noise power, and an optical signal-to-noise ratio for each channel from the digital value.

5 Claims, 4 Drawing Sheets

OPTICAL PERFORMANCE MONITORING APPARATUS FOR A WDM OPTICAL COMMUNICATION SYSTEM

FIELD OF THE INVENTION

The present invention relates to an optical performance monitoring apparatus for a WDM (Wavelength Division Multiplexing) optical communication system; and, more particularly, to an optical performance monitoring apparatus for measuring an optical signal-to-noise ratio for each channel by measuring power and ASE (Amplified Spontaneous Emission) noise for each channel of a WDM signal to monitor optical performance of a WDM optical communication system.

PRIOR ART OF THE INVENTION

In a WDM (wavelength Division Multiplexing) optical communication system having an optical amplifier (EDFA: Erbium-doped fiber amplifier), the optical amplifier amplifies not only a WDM signal but also ASE (Amplified Spontaneous Emission) noise. Therefore, the larger the number of the optical amplifiers is included, the worse optical signal-to-noise ratio of the WDM signal becomes. Accordingly, to ensure the optical signal-to-noise ratio required at a receiver stage, the optical performance monitoring including measuring the optical signal-to-noise ratio of the WDM signal should be performed for each channel at optical transmission section layer including the optical amplifiers.

In conventional techniques for monitoring optical performance for each channel in the WDM optical communication system, a technique employing wavelength selecting filter as an AWG (Arrayed Waveguide Grating) is widely used.

FIG. 1 is a diagram for illustrating configuration of an optical performance monitoring apparatus for each channel in a conventional WDM optical communication system.

FIG. 1 shows configuration of an optical performance monitoring apparatus for each channel in U.S. Pat. No. 5,986,782 proposed by Stephen B. Alexander. In FIG. 1, the optical performance monitoring apparatus 100 comprises a wavelength selecting filter 110, e.g., an AWG, an optical detector 120 and a signal processor 130.

As shown in FIG. 1, the wavelength selecting filter 110 discriminates the WDM signal of J channels into J channel signals ($\lambda_1, \lambda_2, \ldots, \lambda_J$ in FIG. 1) and at least one ASE noise sample ($\lambda_\alpha, \lambda_\Omega$ in FIG. 1). Therefore, to measure ASE noise sample, the wavelength selecting filter 110 should have extra output ports from which power in wavelength in outside of the WDM signal wavelength, i.e., the ASE noise sample power, is outputted. That is, after measuring optical power for each channel at the output ports from which power corresponding to channel wavelength of the WDM signal is outputted and ASE noise power of the extra output ports from which the ASE noise sample power is outputted, the optical signal-to-noise ratio for each channel of the WDM signal is computed by using ASE noise profile pre-stored at a memory for each wavelength of the optical amplifier to total input power. Since the ASE noise profile of the optical amplifier varies depending on the total input power of the WDM signal, the ASE noise profile of the optical amplifier for each channel to the total input power under normal conditions should be pre-stored at the memory within the signal processor 130.

However, in such an optical performance monitoring apparatus, the wavelength selecting filter 110 having at least j+1 output ports for measuring the optical signal-to-noise ratio for each channel of the WDM signal or extra wavelength selecting filters should be included.

And, it is difficult to obtain the ASE noise sample within flat gain bandwidth of the optical amplifier in a WDM optical communication system using the whole flat gain bandwidth of the optical amplifier. Therefore, the ASE noise sample is obtained from outside of the flat gain bandwidth, which leads error in computation of the optical signal-to-noise ratio for each channel of the WDM signal.

SUMMARY OF THE INVENTION

Therefore, it is an object of the present invention to provide an optical performance monitoring apparatus for facilitating measurement of the optical signal-to-noise ratio for each channel with less error and for measuring total ASE noise power to use it for monitoring performance of a WDM optical communication system including an optical amplifier.

In accordance with an aspect of the present invention, there is provided an optical performance monitoring apparatus for use in a WDM (Wavelength Division Multiplexing) optical communication system, the apparatus comprising: a first optical distributor for distributing a WDM signal tapped from an optical transmission line; a plurality of wavelength selectors, each for selecting a predetermined wavelength optical signal from the WDM signal distributed from the first optical distributor; a plurality of first optical detectors, each for detecting power of the predetermined wavelength optical signal for a corresponding one of channels selected by the plurality of the wavelength selectors; a second optical detector for detecting total power of the optical signal distributed from the first optical distributor; a plurality of second optical distributors, each for transmitting the optical signal outputted from the first optical distributor to the corresponding one of the wavelength selectors and transmitting the predetermined wavelength optical signal selected by the corresponding one of the wavelength selectors to the corresponding one of the first detectors; a selector for selecting one of the powers of the optical signals detected by the plurality of the first optical detectors and the second optical detector; a signal converter for converting an analog value of the power applied from the selector to a digital value; and a signal processor for measuring the power for each channel of the WDM signal, a total ASE (Amplified Spontaneous Emission) noise power, and an optical signal-to-noise ratio for each channel from the digital value from the signal converter.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Hereinafter, preferred embodiments of the present invention will be described in detail with reference to the accompanying drawings.

In the present invention, there is provided an optical performance monitoring apparatus for measuring an optical signal-to-noise ratio for each channel by measuring power and ASE (Amplified Spontaneous Emission) noise for each channel of a WDM (wavelength Division Multiplexing) signal to monitor the optical performance of the WDM optical communication system.

Figure 1:
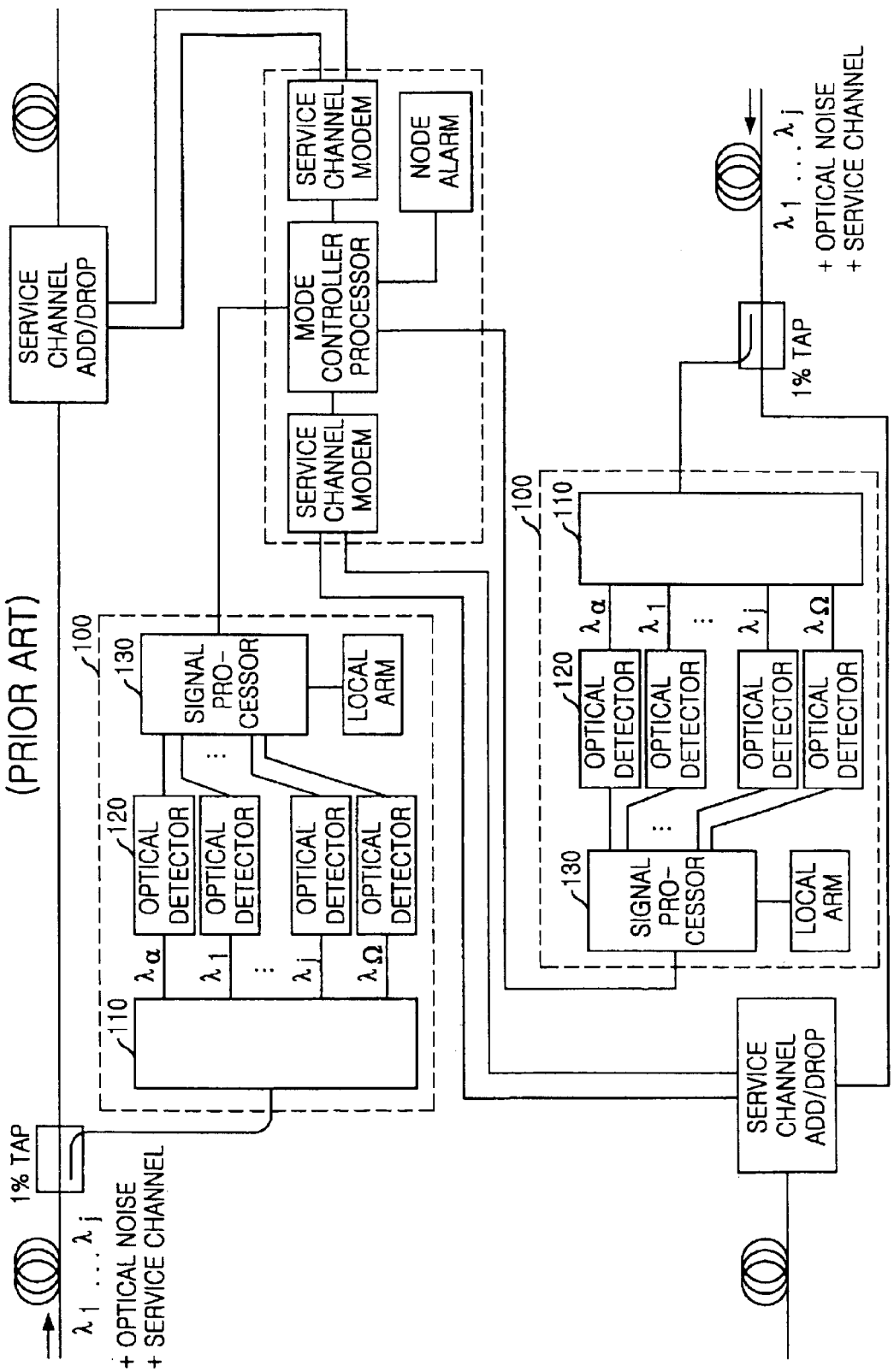
FIG. 1 is a diagram for illustrating configuration of an optical performance monitoring apparatus for each channel in a conventional WDM optical communication system.
Figure 2:
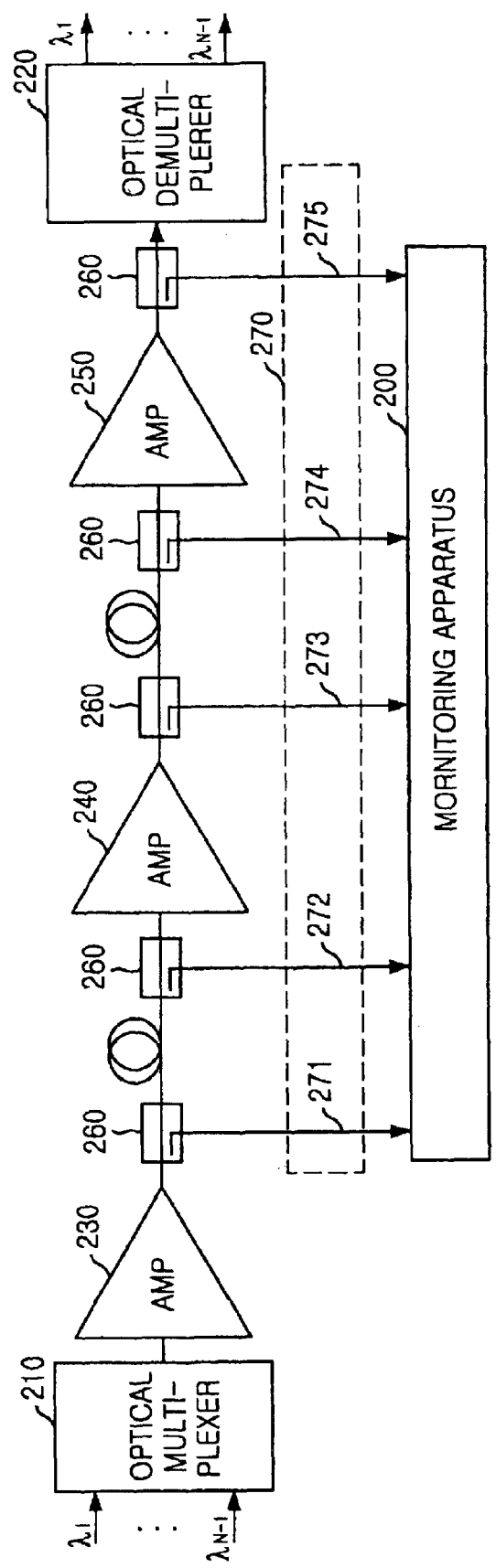
FIG. 2 is an exemplary diagram of a WDM optical communication system to which the present invention can be applied.

FIG. 2 is an exemplary diagram of a WDM optical communication system to which the present invention can be applied.

The WDM optical communication system to which the present invention is applied comprises an optical multiplexer 210 for multiplexing N−1 channel signals, an optical booster amplifier 230 for amplifying WDM signals multiplexed by the multiplexer 210, an optical line amplifier 240 for amplifying the WDM signal transferred through an optical transmission line, an optical pre-amplifier 250, an optical demultiplexer 220 for demultiplexing the WDM signal, transferred through the optical transmission line, depending on each channel wavelength, and an optical performance monitoring apparatus 200 for monitoring optical performance for each channel of the WDM optical communication system. As shown in FIG. 2, the optical performance monitoring apparatus 200 is disposed at input stage and output stage of each amplifier to perform performance monitoring for each channel of the WDM signal transferred through the optical transmission line. Inputs of the optical performance monitoring apparatus 200 are obtained by tapping a part of the WDM signal from the optical transmission line by using optical tap couplers 260.

Figure 3:
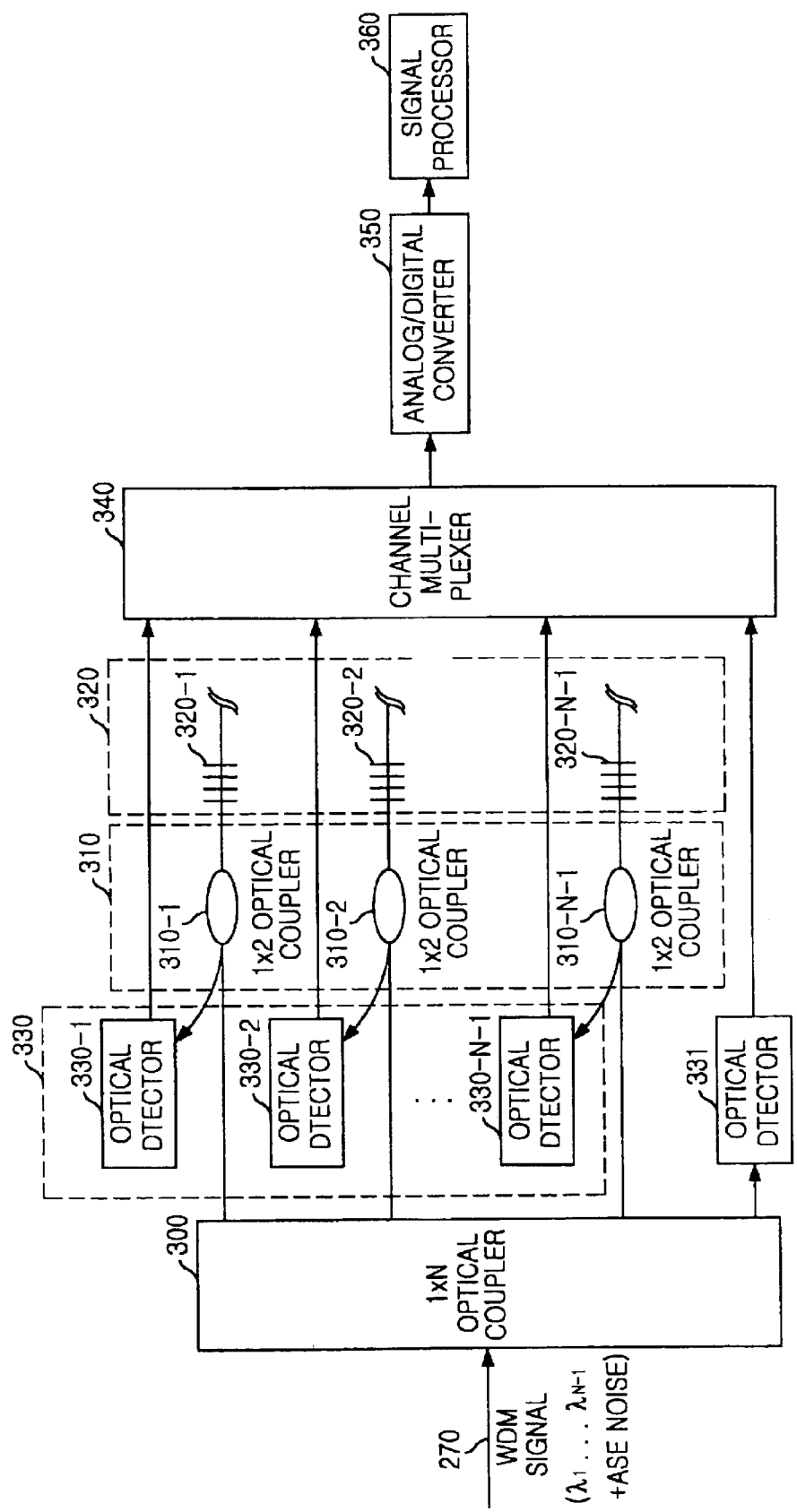
FIG. 3 is a diagram of an embodiment of an optical performance monitoring apparatus for a WDM optical communication system in accordance with the present invention.

FIG. 3 is a diagram of an embodiment of an optical performance monitoring apparatus for a WDM optical communication system in accordance with the present invention.

That is, FIG. 3 shows detailed configuration of the optical performance monitoring apparatus 200 of FIG. 2 according to the present invention.

The optical performance monitoring apparatus 200 in accordance with the present invention includes an 1×N optical coupler 300 for distributing the WDM signal tapped from the optical transmission line to output, a plurality of 1×2 optical couplers 310 receiving the distributed optical signal from the 1×N optical coupler 300, a plurality of optical fiber Bragg gratings 320, each for selecting an optical signal having a corresponding wavelength in the optical signal from the corresponding one of the 1×2 optical couplers 310 to output the selected optical signal to the 1×2 optical coupler 310, a plurality of optical detectors 330, each receiving the optical signal selected by the optical fiber Bragg gratings 320 from the corresponding one of the 1×2 optical couplers 310 to detect optical signal power for each channel of a selected wavelength, an optical detector 331 receiving the optical signal distributed from the 1×N optical coupler 300 directly to detect total power of the received optical signal, a channel multiplexer 340 for outputting sequentially the optical signal detected by the plurality of the optical detectors 330 and the optical detector 331, an analog/digital converter 350 for converting power of analog optical signals sequentially outputted from the channel multiplexer 340 to digital values, and a signal processor 360 for measuring power for each channel and total ASE noise power of the WDM signal by using the digital values from the analog/digital converter 350 and for measuring the optical signal-to-noise ratio for each channel.

Next, it will be described in detail for the operation of the WDM optical communication system in accordance with the present invention.

The WDM signal inputted to the 1×N optical coupler 300 is obtained by tapping 270 a part of the optical signal from the optical transmission line. The input WDM signal including not only N−1 channel WDM signals ($\lambda_1, \lambda_2, \ldots, \lambda_{N-1}$) but also the ASE noise generated by the optical amplifier is inputted to the input port of the 1×N optical coupler 300 through an input optical transmission line. The 1×N optical coupler 300 of the present invention is a typical star type coupler that distributes the input signal to each output port with a predetermined insertion loss. The optical signal outputted from the output port of the 1×N optical coupler 300 is applied to the optical fiber Bragg gratings 320 through the 1×2 optical couplers 310.

Each of the optical fiber Bragg gratings 320 is a wavelength selecting filter that reflects only a channel signal having a center wavelength identical to a corresponding Bragg wavelength and transmits remaining signals. Therefore, in order to measure the optical power for each channel of the input WDM signal, the Bragg wavelength of each of the optical fiber Bragg gratings 320 is designed to be identical to the center wavelength ($\lambda_1, \lambda_2, \ldots, \lambda_{N-1}$) of the WDM signal inputted from the optical transmission line for each channel.

In one embodiment of the present invention, the optical fiber Bragg gratings are used to discriminate the input WDM signal for each channel, but any wavelength selecting filter capable of discriminating the input WDM signal for each channel can be used in place of the optical fiber Bragg gratings.

The channel signals discriminated by the optical fiber Bragg gratings 320 are applied to the optical detectors 330 through the 1×2 optical couplers 310.

Here, the 1×2 optical couplers 310 are used to apply the WDM signal to the optical fiber Bragg gratings 320 and to combine the channel signals reflected from the optical fiber Bragg gratings 320 at the optical detectors 330. Provided that an optical circulator is used instead, the total insertion loss of the optical performance monitoring apparatus 200 can be reduced. That is, when the number of the channels of the input WDM signal is small, a simple cost effective 1×2 optical coupler can be used. On the contrary, when the number of the channels of the input WDM signal is large, the optical circulator is more beneficial than the 1×2 optical coupler 310 because the channel power of the WDM signal at the input stage of the optical detectors 330 and 331 could be smaller than sensitivity of the optical detectors 330 and 331 due to increase of the insertion loss. Each of the channel powers of the WDM signals detected by the optical detectors 330 and 331 are applied to the analog/digital converter 350 through the channel multiplexer 340. The channel multiplexer 340 sequentially applies the outputs of the optical detectors 330 and 331 to the analog/digital converter 350. The analog/digital converter 350 converts an analog value of the power applied from the channel multiplexer 340 to a digital value. The signal processor 360 computes the optical signal-to-noise ratio for each channel of the WDM signal by using the digital value for the power of each channel converted at the analog/digital converter 350, the total input power, and the ASE noise profile for each wavelength of the optical amplifier pre-stored at the memory.

Hereinafter, functional description of the present invention will be provided.

The power for each channel of the input WDM signal can be obtained by measuring the power of each of the channel signals reflected from the optical fiber Bragg gratings 320 at the optical detectors 330. Since the optical fiber Bragg gratings 320 have Bragg wavelengths identical to the center wavelength ($\lambda_1, \lambda_2, \ldots, \lambda_{N-1}$) of the input WDM signal, each of the optical fiber Bragg gratings 320 reflects the channel signal having the wavelength identical to its Bragg wavelength and transmits remaining signals. In order to prevent the signals transmitted from the optical fiber Bragg gratings 320 from being recombined, outputs of the optical fiber Bragg gratings 320 are terminated.

And, a last output port among the output ports of the 1×N optical coupler 300 is coupled to neither the 1×2 optical coupler 310 nor the optical fiber Bragg gratings 320. Therefore, at the optical detector 331 coupled to the last output port, total power of the input WDM signal (WDM signal power+ASE noise power) is measured. Accordingly, the ASE noise power included in the input WDM signal can be obtained as follows $$V_{total,ASE} = V_N - \sum_{i=1}^{N-1} V_{\lambda i} \qquad \text{Eq. (1)}$$

In Eq. (1), $V_{total,ASE}$ represents the total ASE noise power of the input WDM signal, $V_N$ represents the total power of the WDM signal measured at the optical detector 331, and $V_{\lambda i}$ represents the i-th channel power of the WDM signal measured at the corresponding one of the optical detectors 330. The ASE noise power for each channel can be obtained by using the total ASE noise power measured by Eq. (1), the channel power of the WDM signal, and the ASE noise profile for each channel to input power level of the optical amplifier under normal conditions pre-stored at the memory in the signal processor 360.

Figure 4:
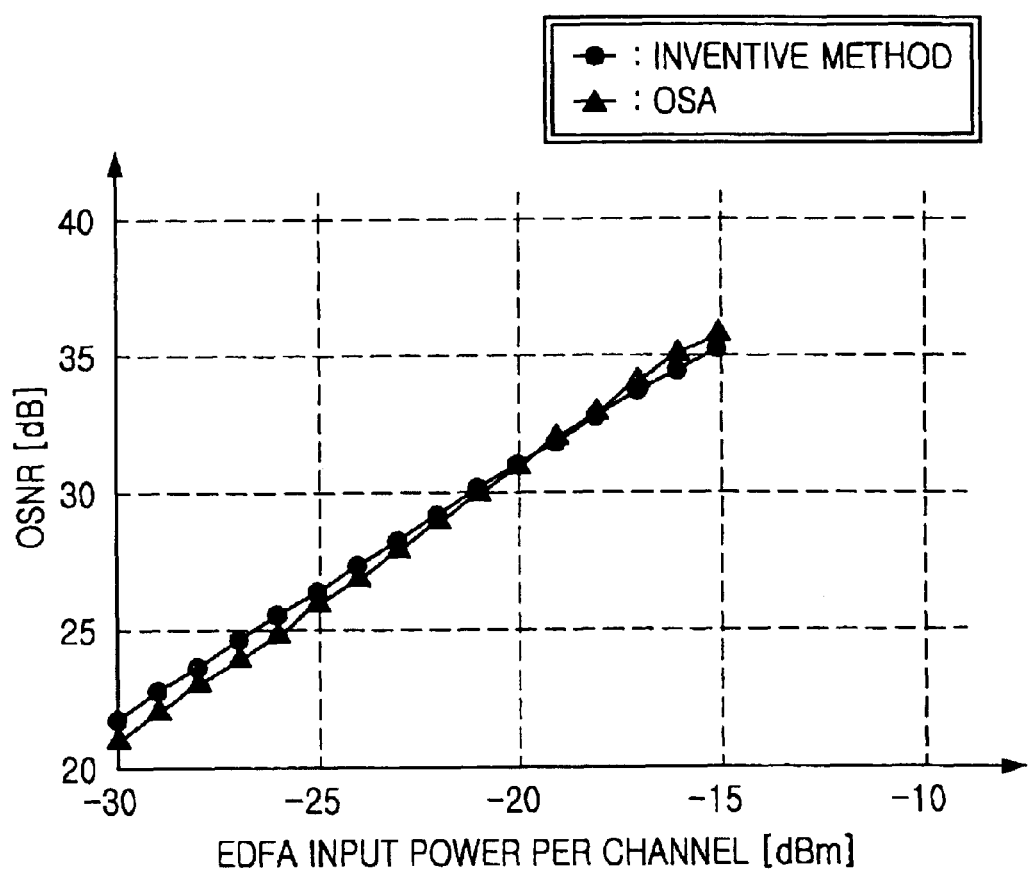
FIG. 4 is a graph of an optical signal-to-noise ratio for each channel of a WDM signal in accordance with the present invention.

FIG. 4 is a graph of the optical signal-to-noise ratio for each channel of the WDM signal in accordance with the present invention.

The graph of FIG. 4 shows a measurement result of the optical signal-to-noise ratio for each channel of the WDM optical communication system in an embodiment of the present invention, which is compared to a result measured by a commercially available optical spectrum analyzer having 0.1 nm resolution.

In the present invention, the total ASE noise power of the optical amplifier can be measured as well as the optical signal-to-noise ratio for each channel of the WDM signal in the WDM optical communication system. Therefore, when the measured total ASE noise power is larger than upper limit of the total ASE noise power of the optical amplifier stored at the signal processor 360, an alerting signal transferred to an optical amplifier control circuit so as to use it for performance monitoring for the WDM optical communication system including the optical amplifier.

As described above, extra wavelength selecting filter or extra output port of the wavelength selecting filter to obtain the ASE noise sample is not required in the present invention. Therefore, the optical performance monitoring apparatus can be constructed simply and cost effectively. Furthermore, Not only the optical signal-to-noise ratio for each channel of the WDM signal but also the total ASE noise power of the optical amplifier can be measured in the present invention.

While the present invention has been shown and described with respect to the particular embodiments, it will be apparent to those skilled in the art that many changes and modifications may be made without departing from the spirit and scope of the invention as defined in the appended claims.

What is claimed is:

1. An optical performance monitoring apparatus for use in a WDM (Wavelength Division Multiplexing) optical communication system, the apparatus comprising:

a first optical distributing means for distributing a WDM optical signal branched from an optical transmission line;

a plurality of wavelength selecting means, each for selecting a predetermined wavelength optical signal from the optical signal distributed from the first optical distributing means;

a plurality of first optical detecting means, each for detecting power of the predetermined wavelength optical signal for a corresponding one of channels selected by the plurality of the wavelength selecting means;

a second optical detecting means for detecting total power of the optical signals distributed from the first optical distributing means;

a plurality of second optical distributing means, each for transmitting the optical signal outputted from the first optical distributing means to the corresponding one of the wavelength selecting means and transmitting the predetermined wavelength optical signal selected by the corresponding one of the wavelength selecting means to the corresponding one of the first detecting means;

a selecting means for selecting one of the powers of the optical signals detected by the plurality of the first optical detecting means and the second optical detecting means;

a signal converting means for converting an analog value of the power applied from the selecting means to a digital value; and a signal processing means for measuring the power for each channel of the WDM optical signal, a total ASE (Amplified Spontaneous Emission) noise power, and an optical signal-to-noise ratio for each channel from the digital value from the signal converting means, wherein the total ASE noise power equals the total power of the optical signals measured by the plurality of the first optical detecting means substracted from the total power of the optical signals measured by the second optical detecting means and an ASE noise power for each channel is determined by the total ASE noise power, a channel power of the WDM optical signal and an ASE noise profile.

2. The apparatus as recited in claim 1, wherein the signal processing means includes a memory storing ASE noise profile for each wavelength of the optical amplifier depending on input power level and a upper limit the total ASE noise power of the optical amplifier.

3. The apparatus as recited in claim 2, wherein the plurality of the wavelength selecting means are optical fiber Bragg gratings.

4. The apparatus as recited in claim 1, wherein the second optical distributing means is an 1×2 optical coupler.

5. The apparatus as recited in claim 1, wherein the second optical distributing means is an optical circulator.

* * * * *